3,442,981
ABS POLYMERS AND PROCESS FOR
MAKING THE SAME
Owen L. Stafford, Donald V. Wing, and Duane E. Stolsmark, Midland, Mich., assignors to The Dow Chemical Company, Midland, Mich., a corporation of Delaware
No Drawing. Filed Feb. 28, 1966, Ser. No. 530,394
Int. Cl. C08f 33/08, 29/56, 29/12
U.S. Cl. 260—880           3 Claims

ABSTRACT OF THE DISCLOSURE

A process for making an ABS polymer which comprises polymerizing a stable solution of styrene, acrylonitrile, resinous copolymer of styrene and acrylonitrile and a block copolymer of a predominant amount of butadiene and a minor amount of styrene.

---

This invention concerns new ABS polymers and a process for making the same.

U.S. Patent 3,168,593 makes an ABS polymer by polymerizing butadiene in emulsion to form a synthetic latex, then adding a mixture of styrene and acrylonitrile to the latex and polymerizing the monomers in the presence of the butadiene polymer to form a polymeric resin.

U.S. Patent 2,692 makes an ABS polymer by dissolving a rubbery copolymer of styrene and butadiene in a mixture of monomeric styrene and acrylonitrile and thereafter polymerizing the monomers.

In making ABS polymers by dissolving an elastomer or synthetic rubber in ethylenically unsaturated monomers capable of addition polymerization and heating the solution at elevated temperatures to polymerize the monomers and form a normally solid thermoplastic polymer, the occurrence of phase separation as indicated by opacity of the system is usually observed. We have found that during this process of polymerization, a significant change occurs in the character of the polymerizing solution, usually in the range of from about 5 to 30 percent by weight of monomer being polymerized. We have observed that the solution, that may be initially a one-phase solution of the elastomer as the only solute dissolved in the monomer, changes to a two-phase system as monomer is polymerized, thereby forming a polymer as the second solute. In a similar study, it has been found that a solution of an elastomer and a resinous polymer dissolved in a monomer or a mixture of monomers will separate into two or more distinct layers. Our microscopical investigations revealed that a multiphase system is, at first, a dispersion of droplets of the polymer solution in a continuous phase of the elastomer solution, and that a phase inversion occurs after which the system is a dispersion of droplets of the elastomer solution in a continuous phase of the polymer solution. We consider such a polymerizing system as an oil-in-oil emulsion and compare the occurring phase inversion to the phase inversion reported to occur under certain conditions in oil-water emulsions. On further polymerization, the oil-in-oil emulsions solidify by polymerization of the monomer to form the final polymer. In the solid polymer the elastomer is dispersed in the form of fine particles. The size of these particles are significant for determining the properties of the final polymer, and are established by the observed phase inversion.

In preparing ABS polymers, if a rubbery copolymer of styrene and butadiene or another elastomer is dissolved in a mixture of monomeric styrene and acrylonitrile, together with a copolymer of said monomers, the resulting system will separate upon standing into two or more phases, namely, into two or more immiscible solutions of the elastomer and the polymer dissolved in the monomers. These phases can be dispersed in each other by rapid agitation, but the resulting dispersion is unstable and separates readily into two or more liquid layers upon standing quiescent. The product obtained when such an unstable solution or dispersion of starting material is converted by polymerization of the monomer into a resinous normally solid polymer, is less satisfactory than is desired.

We have now discovered that stable solution of both a rubbery copolymer of styrene and butadiene and a copolymer of styrene and acrylonitrile are obtained by dissolving a rubbery block copolymer, together with a copolymer of styrene and acrylonitrile in monomeric styrene and acrylonitrile as a solvent and that said solution can readily be polymerized to form ABS polymers as more fully hereinafter described.

It has further been found that the stable solutions can be heated at elevated temperatures, e.g. at temperatures between 80° C. and 180° C., in admixture with, or without, a polymerization initiator, and the monomer therein be polymerized in usual ways such as in mass, or in aqueous suspension, to produce normally solid resinous thermoplastic ABS polymers containing the elastomeric block copolymer uniformly dispersed throughout, and chemically combined or having grafted thereon the styrene and acrylonitrile, and in the form of small particles intimately incorporated and chemically combined throughout the polymeric product.

The rubbery block copolymer to be employed can be a block copolymer of a predominant amount of butadiene and a minor amount of styrene having substantially the schematic structure $$[\ldots -BBBBBBBBBBBB]_x-[SSSSSS-\ldots]_y$$

wherein B represents a butadiene unit, S represents a styrene unit, $x$ represents from about 50 to 90, preferably from 60 to 85, percent, and $y$ represents from about 50 to 10, preferably from 40 to 15, percent, by weight of the sum of the butadiene and styrene chemically combined in the block copolymer. In general, the rubbery block copolymers will have a Mooney viscosity (ML+4 at 212° F.) of from about 35 to 55, and are available commercially. The rubbery block copolymer can be used in amounts corresponding to from 2 to 28 preferably from 8 to 16, percent by weight of the starting materials.

The resinous thermoplastic copolymer can be a copolymer of from about 14 to 35 percent by weight of acrylonitrile and from 65 to 86 percent by weight of styrene, having a molecular weight corresponding to a viscosity characteristic of from 5 to 30 centipoises as determined for a 10 weight percent solution of the copolymer in methyl ethyl ketone at 25° C. The resinous copolymer can be employed in amounts of from 2 to 24, preferably from 6 to 12, percent by weight of the starting materials.

The monomeric acrylonitrile and styrene make up the balance of the starting materials and are employed in amounts corresponding to from about 8 to 25 percent by weight of acrylonitrile and from about 44 to 65 percent by weight of styrene, based on the total weight of the starting materials, i.e. the sum of the weights of the rubbery block copolymer, the resinous thermoplastic copolymer and the monomeric acrylonitrile and styrene. The styrene and acrylonitrile monomers are preferably employed in proportions of from 65 to 84 percent by weight of the styrene and from 35 to 14 percent of the acrylonitrile, based on the sum of the weights of said monomers. Best results are usually obtained when the acrylonitrile and styrene monomers are employed in any given mixture in proportions to one another in about the same ratio as they are chemically combined in the resinous copolymer of styrene and acrylonitrile used as starting material.

The stable solutions or dispersions of the rubbery block copolymers and the resinous thermoplastic copolymers dissolved in the monomers, i.e., the styrene and acrylonitrile, can be prepared in any usual way, e.g., by mixing the ingredients with one another in the desired proportions and stirring or agitating the same at room temperature or thereabout and at atmospheric, superatmospheric or subatmospheric pressure.

Alternatively, the rubbery block copolymer can be dissolved in monomeric styrene, then mixed with a solution of the resinous copolymer dissolved in styrene or a mixture of styrene and acrylonitrile, after which additional styrene or acrylonitrile or both styrene and acrylonitrile are added to provide a stable solution containing the ingredients in the desired proportions.

The solutions are of uniform composition and are stable against separating into layers or phases upon standing quiescent at room temperature for prolonged periods of time. In repeated tests of the solutions, they have been found to show no tendency to separate into layers upon standing quiescent at room temperature for one week.

The stable solutions can readily be polymerized to produce resinous ABS polymers of uniform composition having improved processability and physical properties.

The stable solutions can be polymerized in usual ways, e.g., by heating the same in mass, or in aqueous suspension, preferably in admixture with a small amount of a free radical generating catalyst or initiator, and optionally a small amount of an antioxidant.

Among suitable catalysts or initiators are $\alpha,\alpha'$-azobisisobutyronitrile, benzoyl peroxide, di-tert.-butyl peroxide, dicumyl peroxide, and di-tert.-butyl peracetate.

A useful antioxidant is 2,6-di-tert.-butyl-4-methylphenol.

The stable solution is preferably polymerized while dispersed or suspended as droplets in an aqueous medium containing a suspending agent such as carboxymethyl methyl cellulose, finely divided tricalcium phosphate, zinc oxide, or basic magnesium carbonate.

The polymerization can be carried out at temperatures between about 80° and 180° C. and at atmospheric or superatmospheric pressures, but is preferably carried out in the aqueous suspension at temperatures between 110° and 160° C. and under the autogeneous pressure of the mixture of the reactants.

The polymer is recovered in usual ways, e.g., by filtering, and is washed with water and is dried.

The following examples illustrate ways in which the principle of the invention has been applied, but are not to be construed as limiting its scope.

EXAMPLE 1

(A) A charge of 100 grams of a rubbery block copolymer of approximately 25 weight percent styrene and 75 weight percent butadiene, having the schematic structure

... –BBBBBBBBBBBBBBBBBBBBBBBBBBBSSSSSSSS– ...

wherein "B" represents a butadiene unit and "S" a styrene unit, and which block copolymer had a Mooney viscosity (ML–4 at 212° F.) of 42, was stirred and dissolved in a mixture of 580 grams of monomeric styrene and 220 grams of acrylonitrile, together with 100 grams of a resinous thermoplastic copolymer of about 24 weight percent acrylonitrile and 76 weight percent styrene, which copolymer had a molecular weight corresponding to a viscosity characteristic of 11.5 centipoises as determined for a 10 weight percent solution of the copolymer in methyl ethyl ketone at 25° C. The resulting solution was allowed to stand quiescent at room temperature for 7 days. It was a stable solution of the monomers, the rubbery block copolymer, and the resinous thermoplastic copolymer. There was no tendency of the solution to separate into layers after standing quiescent for 7 days.

(B) In contrast, a solution prepared by dissolving 100 grams of a rubbery random copolymer of approximately 25 weight percent styrene and 75 weight percent butadiene, having the schematic structure

... –BBB–S–BB–S–BBBB–SS–BB–S–BBB–S–BBBB–S–BBB–S–. ...

and a Mooney viscosity similar to that of the block copolymer used in part (A) above, in a mixture of 580 grams of monomeric styrene and 220 grams of acrylonitrile, together with 100 grams of a resinous thermoplastic copolymer of about 24 weight percent acrylonitrile and 76 weight percent styrene like that used in part (A) above, is found to separate into distinct layers after standing quiescent at room temperature overnight.

(C) The solution, containing the rubbery block copolymer, prepared in part A above, was blended with 0.16 gram of di-tert.-butyl peroxide as polymerization initiator or catalyst and 1.6 grams of 2,6-di-tert.-butyl-4-methylphenol. The mixture was placed in a pressure resistant vessel equipped with a stirrer, together with 1000 grams of water containing dissolved therein 34 grams of crude sodium carboxymethyl methyl cellulose, consisting of one-third part by weight of sodium carboxymethyl methyl cellulose, a cellulose derivative having an average of 0.25 —OCH$_2$COOH group and 1.8 —OCH$_3$ groups per mole of cellulose, one-third part by weight of sodium chloride and one-third part by weight of water, as dispersing agent. The crude sodium carboxymethyl methyl cellulose had a viscosity of 1700 centipoises as determined for a 2 weight percent solution of the material in water at 25° C. The resulting mixture was stirred to maintain the liquid starting material suspended as droplets in the aqueous medium and was heated in the closed vessel to polymerize the monomer under time and temperature conditions as follows: 4 hours at 130° C.; 4 hours at 140° C.; and 2 hours at 150° C. Thereafter, the vessel was cooled, was opened and the polymer product removed. The product was separated by filtering and was washed with water and dried. Portions of the polymer were compression molded at 420° F. and 470 pounds per square inch gauge pressure. Test bars of ½ x ⅛ x 4 inches long were cut from the molded sheet. These test bars were used to determine tensile strength and elongation values for the product employing procedures similar to those described in ASTM D638–57T. Impact strength was determined by procedure similar to that described in ASTM D256–57T. Other test bars were used to determine a Vicat softening point for the polmer.

Portions of the polymer product were injection molded to form pieces ⅛ inch thick by 6.5 inches long having the end portions of ⅛ x ¾ inch cross section by 1⅛ inches long tapering to a midportion of ⅛ x ½ inch cross section by 3 inches long. The testpieces were molded on a standard plastics injection molding machine having a tunnel capacity such that the polymer was heated therein for a period of time of about 200 seconds when the machine was operated on a 45 second molding cycle to form a bar. The procedure was to maintain the molding pressure applied to the plastic at a constant value, e.g., 10,000 pounds per square inch, and change the temperature at which the polymer was heated until the flow rate of the plastic under the applied molding pressure was just sufficient to fill the mold in a period of 45 seconds. This flow temperature (often called "short short temperature"), was observed. The flow temperature is a measure of the processability of the polymer product.

(D) The solution containing the rubbery random copolymer prepared in part B above was mixed with 0.16 gram of di-tert.-butyl peroxide and 1.6 grams of 2,6-di-tert.-butyl-4-methylphenol, then was subjected to polymerizing conditions similar to those employed in part C above. The polymer product was tested in similar ways. The properties determined for the polymer product prepared from the rubbery block copolymer are reported under B below. The properties of the polymer prepared from the rubbery random copolymer are reported under A below. The polymers had the properties.

|  | A | B |
|---|---|---|
| Tensile strength (lbs./sq. in.) | 2,487 | 4,843 |
| Impact strength (ft.-lbs.) | 1.4 | 3.8 |
| Vicat heat distortion temp. (° C) | 95 | 95 |
| Flow temperature (° F.) | 455 | 425 |
| Volatile (percent) | 3.5 | 3.6 |

EXAMPLE 2

A solution consisting of 160 grams of a rubbery block copolymer similar to that employed in part A of Example 1, a charge of 100 grams of a resinous copolymer of 24 weight percent acrylonitrile and 76 weight percent styrene, 530 grams of monomeric styrene and 210 grams of acrylonitrile was prepared by stirring the ingredients together at room temperature. The solution showed no tendency to separate into layers after standing quiescent at room temperature for 7 days. The solution was mixed with 0.16 gram of di-tert.-butyl peroxide and 1.6 gram of 2,6-di-tert.butyl-4-methylphenol, then was polymerized in aqueous suspension employing procedure similar to that employed in Example 1. The polymer product had the properties:

| | |
|---|---|
| Tensile strength, lbs./sq. in. | 4590 |
| Impact strength, ft.-lbs. | 6.7 |
| Vicat heat distortion temp., ° C. | 104 |
| Flow temperature, ° F. | 465 |
| Volatile, percent | 1.9 |

EXAMPLE 3

In each of a series of experiments, a stable solution consisting of 13 percent by weight of a rubbery block copolymer of butadiene and styrene similar to that employed in Example 1, 23.1 percent of acrylonitrile, 53.9 percent of monomeric styrene and 10 percent by weight of a resinous thermoplastic copolymer of styrene and acrylonitrile as defined in the following table, was prepared by stirring the ingredients together at room temperature. The solutions showed no tendency to separate into layers upon standing quiescent at room temperature for 7 days. The solutions were polymerized and the polymer product recovered and tested employing procedures similar to those employed in part C of Example 1. The resinous copolymer employed in experiment A was a copolymer of 29 weight percent acrylonitrile and 71 weight percent styrene having a molecular weight of 147,000 and a viscosity characteristic of 15 centipoise. The copolymer employed in experiment B was a copolymer of 24 weight percent acrylonitrile and 76 weight percent styrene. The copolymer employed in experiment C was a copolymer of 34 weight percent acrylonitrile and 66 weight percent styrene. The polymers had the properties:

|  | A | B | C |
|---|---|---|---|
| Tensile strength (lbs./sq. in.) | 5,090 | 3,490 | 4,340 |
| Elongation (percent) | 2.1 | 3.3 | 3.4 |
| Impact strength (ft.-lbs.) | 6.9 | 7.3 | 5.8 |
| Vicat heat distortion temp. (° C.) | 100 | 101 | 100 |
| Acrylonitrile [1] (percent) | 20.1 | 18.4 | 20.2 |

[1] In chemically combined or polymer form.

EXAMPLE 4

A solution was prepared consisting of 8 percent by weight of a rubbery block copolymer of approximately 85 percent by weight of butadiene and 15 percent of styrene (which block copolymer had a Mooney viscosity, ML-4 at 212° F., of 43.5), 10 percent by weight of a resinous thermoplastic copolymer of about 24 percent acrylonitrile and 76 percent styrene, 23 percent acrylonitrile and 59 percent monomeric styrene, by stirring the ingredients together at room temperature. The solution was stable. It did not separate into layers upon standing quiescent at room temperature for 7 days.

In contrast when a similar solution is prepared in the same way except using a random rubbery copolymer of 85 weight percent butadiene and 15 weight percent styrene, the solution is found to separate into distinct layers upon standing quiescent at room temperature for a few hours.

EXAMPLE 5

In each of a series of experiments, stable solution of a rubbery block copolymer of styrene and butadiene similar to that employed in part A of Example 1, a resinous thermoplastic copolymer of styrene and acrylonitrile as hereafter defined, and monomeric styrene and acrylonitrile in proportions as stated in the following table, was prepared by stirring the ingredients together at room temperature until a homogeneous solution or uniform dispersion was obtained. Thereafter, the solution or dispersion was allowed to stand quiescent at room temperature in the dark for a period of 7 days then was observed for tendency to separate into layers. Each of the solutions was of uniform composition, and showed no tendency to separate into layers. In contrast, when similar solutions are prepared except employing GR–S 1006 type synthetic rubber (a random copolymer of about 75 weight percent butadiene and 25 weight percent styrene, prepared in emulsion), the solution or dispersion is found to separate into distinct layers upon standing quiescent at room temperature for only a few hours. Among stable solutions that were prepared from the rubbery block copolymer, and from a rubbery block copolymer of approximately 16 weight percent styrene and 84 weight percent butadiene, together with a resinous copolymer of styrene and acrylonitrile, and the monomeric styrene and acrylonitrile, are those set out in the following Tables I, II and III.

TABLE I

| Run No. | 75% butadiene, 25% styrene block copolymer pts. | 76% styrene, 24% VCN resinous copolymer pts. | Monomers Styrene pts. | Monomers VCN pts. |
|---|---|---|---|---|
| 1 | 10 | 8 | 59 | 23 |
| 2 | 10 | 15 | 54 | 25 |
| 3 | 13 | 8 | 57 | 22 |
| 4 | 13 | 13 | 53 | 21 |
| 5 | 16 | 6 | 56 | 22 |
| 6 | 16 | 12 | 52 | 20 |
| 7 | 20 | 2 | 52 | 20 |
| 8 | 20 | 4 | 55 | 21 |
| 9 | 20 | 6 | 53 | 21 |
| 10 | 20 | 8 | 52 | 20 |
| 11 | 20 | 11 | 50 | 19 |
| 12 | 24 | 2 | 53 | 21 |
| 13 | 24 | 4 | 52 | 20 |
| 14 | 24 | 6 | 51.5 | 18.5 |
| 16 | 24 | 8 | 49 | 19 |
| 17 | 24 | 10 | 47.5 | 18.5 |

TABLE II

| Run No. | 75% butadiene, 25% styrene block copolymer pts. | 66% styrene, 34% VCN resinous copolymer pts. | Monomers Styrene pts. | Monomers VCN pts. |
|---|---|---|---|---|
| 1 | 10 | 10 | 53 | 27 |
| 2 | 13 | 7 | 53 | 27 |
| 3 | 13 | 10 | 51 | 26 |
| 4 | 16 | 4 | 53 | 27 |
| 5 | 16 | 7 | 51 | 26 |
| 6 | 16 | 10 | 49 | 25 |
| 7 | 20 | 4 | 50 | 26 |
| 8 | 20 | 7 | 48 | 25 |
| 9 | 20 | 10 | 46 | 24 |
| 10 | 25 | 2 | 48 | 25 |
| 11 | 25 | 4 | 47 | 24 |
| 12 | 25 | 6 | 45.5 | 23.5 |
| 13 | 25 | 8 | 44 | 23 |

TABLE III

| Run No. | 84% butadiene, 16% styrene block copolymer pts. | 71% styrene, 29% VCN resinous copolymer pts. | Monomers Styrene pts. | VCN pts. |
|---|---|---|---|---|
| 1 | 8 | 8 | 60.5 | 23.5 |
| 2 | 8 | 10 | 59 | 23 |
| 3 | 10 | 6 | 60.5 | 23.5 |
| 4 | 10 | 8 | 59 | 23 |
| 5 | 16 | 2 | 59 | 23 |
| 6 | 16 | 8 | 55 | 21 |
| 7 | 20 | 2 | 56 | 22 |
| 8 | 20 | 10 | 50.5 | 19.5 |
| 9 | 24 | 2 | 53 | 21 |
| 10 | 24 | 10 | 47.5 | 18.5 |
| 11 | 28 | 2 | 50.5 | 19.5 |
| 12 | 28 | 4 | 49 | 21 |
| 13 | 28 | 6 | 47.5 | 18.5 |
| 14 | 28 | 8 | 46 | 18 |

We claim:

1. In a process for making an ABS polymer by polymerizing styrene, acrylonitrile and a rubbery copolymer of butadiene and styrene in admixture with one another, the improvement which comprises dissolving in monomeric styrene and acrylonitrile, a rubbery block copolymer of a predominant amount of butadiene and a minor amount of styrene and having substantially the schematic structure

[... —BBBBBBBBB—]$_x$[SSSSSS— ...]$_y$ wherein B represents a butadiene unit, S represents a styrene unit, $x$ represents from about 50 to 90 percent and $y$ represents from about 50 to 10 percent by weight of the sum of the butadiene and styrene chemically combined in the copolymer and a resinous copolymer of styrene and acrylonitrile sufficient to form a stable solution, and thereafter polymerizing said monomers.

2. An ABS polymer prepared by polymerizing a stable solution of from 2 to 28 percent by weight of a rubbery block copolymer of from 60 to 85 weight percent of butadiene and from 40 to 15 weight percent styrene, from 2 to 24 percent by weight of a resinous thermoplastic copolymer of from 65 to 86 weight percent styrene and from 35 to 14 weight percent acrylonitrile, from 8 to 25 percent by weight monomeric acrylonitrile and from 44 to 65 percent by weight of styrene, the proportions of said ingredients being based on 100 parts by weight of the sum of the block copolymer, the resinous copolymer, the monomeric acrylonitrile and the monomeric styrene, while agitating and heating said stable solution in admixture with water containing a dispersing agent at temperatures between 80° and 180° C. until the monomers are substantially completely polymerized.

3. An ABS polymer as claimed in claim 2, wherein the rubbery block copolymer is a copolymer of about 75 weight percent butadiene and about 25 weight percent styrene.

References Cited

UNITED STATES PATENTS 2,948,703  8/1960  Schroeder _____ 260—880
3,264,374  8/1966  Jones.

GEORGE F. LESMES, Primary Examiner.

U.S. Cl. X.R.

260—876